United States Patent Office 2,930,811
Patented Mar. 29, 1960

2,930,811

LIQUID MIXTURES OF ADDUCTS OF ALKYL BENZENE AND ACRYLIC ACID ESTERS AND METHOD OF PREPARING THEM

Joseph E. Fields, Dayton, Ohio, assignor to Monsanto Chemical Company, St. Louis, Mo., a corporation of Delaware No Drawing. Application December 17, 1954
Serial No. 476,091

7 Claims. (Cl. 260—475)

The present invention relates to polycarboxylates, and a method of producing the same.

According to the invention there are provided new and highly valuable liquid mixtures of polycarboxylates by the free-radical catalyzed addition of certain alkyl benzenes and certain alkyl or alkoxyalkyl esters of acrylic acid. The reaction is one of simple addition in which one mole of the alkylbenzene adds to from 1–50 moles of the ester, substantially according to the scheme:

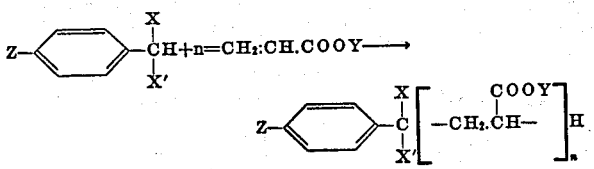

in which Z is selected from the class consisting of hydrogen and alkyl radicals of from 1 to 3 carbon atoms, X and X' are selected from the class consisting of hydrogen and the methyl radical, n is an integer from 1 to 50 and Y is selected from the class consisting of alkyl and alkoxyalkyl radicals of from 1 to 8 carbon atoms.

Alkylbenzenes suitable for the present purpose are selected from the class consisting of mono- and dialkyl-substituted benzenes in which each alkyl radical has from 1 to 3 carbon atoms. As illustrative of alkylbenzenes useful for the present purpose may be mentioned, e.g., toluene, o-, m-, and p-xylene, ethylbenzene, o-, m-, and p-ethyltoluene, cumene, o-, m-, and p-dipropylbenzene, o-, m-, and p-ethylcumene, etc. Such alkyl benzenes possess at least one alkyl radical having a labile alpha-hydrogen atom. Alkyl or alkoxyalkyl esters of acrylic acid which may be employed include, e.g., methyl, ethyl, propyl, isopropyl, butyl, isobutyl, sec-butyl, tert-butyl, amyl, isoamyl, tert-amyl, sec-amyl, hexyl, heptyl, 2-ethylhexyl or octyl acrylate and methoxyethyl, 2-ethoxyethyl, 2-ethoxypropyl, 4-butoxybutyl and 2-hexyloxyethyl acrylate. A mixture of different alkyl acrylates may be employed to give, e.g., adducts having different recurring acrylate units. Adducts may be obtained by reacting one of the present alkylbenzenes with a mixture of a lower alkyl acrylate and a higher alkyl acrylate, for example, a mixture of equal amounts of ethyl acrylate and octyl acrylate whereby there are formed addition products having both ethyl and octyl radicals.

Adducts of the above general formula in which Y is an alkyl or alkoxyalkyl radical of from 3 to 8 carbon atoms and in which n is an integer of from 10 to 50 are stable, viscous liquids which may be employed for a variety of commercial and industrial purposes. They are advantageously employed as substantially non-volatile plasticizers for vinyl chloride polymers such as polyvinyl chloride, vinyl chloride-vinyl acetate copolymers, etc.

The present adducts are readily obtainable by contacting the alkylbenzene with the acrylate at ordinary or increased temperatures in the presence of a free-radical-liberating agent as catalyst until formation of adducts having the desired viscosity characteristics has taken place. The reaction may be effected by mixing together the alkylbenzene, the ester, and the catalyst, and maintaining the resulting mixture, advantageously with agitation, at a temperature which permits steady decomposition of the catalyst and consequent steady liberation of phenyl-alkylene free-radicals. Or, if desired, the ester may be added gradually, e.g., dropwise, to the alkylbenzene, while constantly maintaining an optimum quantity of active catalyst in the reaction zone, which zone is preferably kept at a temperature conducive to the formation of free-radicals. Depending upon the nature of the individual reactants and catalyst and the properties desired in the final product, increased temperatures, e.g., temperatures of from about room temperature to about 125° C. may be generally employed. The reaction time may vary from, say, several hours to several days. Variation of catalyst quantity has been found to have a definite effect on the nature of the adduct. While catalyst quantities of up to 10% based on the weight of the ester may be used, I have found that generally a catalyst range of from 0.1% to 5% is preferable. The use of the greater proportions of catalyst within this range tends to favor formation of the lower viscosity adducts, and the use of lower quantities of catalyst tends to favor formation of the high viscosity adducts, i.e., adducts having a 10% cyclohexanone specific viscosity, of, say, 2.5 to 4.0. The ratio of alkylbenzene to ester used also influences the average molecular-weight of the adduct. Substantially equimolar quantities of the alkylbenzene and the ester may be used; however, for the production, in good yields, of adducts having a 10% cyclohexanone specific viscosity of from 0.5 to 4.0, an excess of the alkylbenzene is preferred.

Formation of the present adducts probably proceeds through a chain mechanism, with termination of the chain at an early stage, i.e., at a point at which no more than 50 moles of the ester have added to one mole of the alkylbenzene. Depending upon the nature and the quantity of the reactants and of free-radical-liberating agent, as well as upon the reaction conditions, chain propagation may be terminated at various stages to yield products in which from 10 to 50 moles of the ester have added to one mole of the alkylbenzene.

An extraneous, inert solvent or diluent, e.g., benzene or hexane may be employed, either to serve as catalyst solvent, to mitigate reaction heat, or to dilute the concentration of the ester in the reaction mixture. The use of such a solvent or diluent, however, is generally of little economic advantage.

Free-radical-liberating agents which may be employed in promoting addition of present acrylates to the alkylbenzenes are compounds which will decompose to give free radicals. Such compounds include peroxygen-type catalysts, for example, acyl peroxides such as acetyl, benzoyl, lauroyl, or stearoyl peroxides; hydrocarbon peroxides or hydroperoxides such as di-tert-butyl peroxide, di-tert-amyl peroxide, tert-butyl hydroperoxide, cumene hydroperoxide, or p-cymene hydroperoxide; and inorganic per-compounds such as hydrogen peroxide, and alkali percarbonates; hydrazine derivatives such as hydrazine hydrochloride and dibenzoyl hydrazine; organo-metallic compounds such as tetraethyl lead, etc. For convenience, the peroxygen-type catalysts will be hereinafter referred to as peroxidic compounds. Only catalytic quantities of the free-radical-liberating agent need be employed in promoting the addition reaction. Quantities of as little as 0.001 percent to 1.0 percent, based on the weight of the ester, are generally sufficient to give optimum yields of the present polycarboxylates. In order to avoid detrimental side reactions, quantities of more than 10 percent of the catalyst, based on the weight of the ester should not be employed. Ultraviolet light may be employed with the catalyst or as the sole catalytic agent.

The invention is further illustrated, but not limited, by the following examples:

Example 1

This example shows the preparation of adducts of toluene and butyl acrylate or amyl acrylate, employing benzoyl peroxide as catalyst. The reaction was effected by mixing together the reactants and catalyst in the quanties indicated below and maintaining flasks of the resulting mixtures on a rotating rack at 43 r.p.m. at a temperature of 90° C. for 48 hours. At the end of that time, unreacted material was removed by distilling through a 10″ Vigreux column. The residues were adducts having 10% cyclohexanone specific viscosities shown in the table below. For purposes of comparison there are also included data obtained on similarly conducted reactions effected with benzene.

| Expt. No. | Constituents of Reaction Mixture | Product g. | specific viscosity |
|---|---|---|---|
| 1 | Butyl Acrylate 30 g. (0.234 mol)<br>Toluene 108 g. (1.17 mol)<br>Benzoyl peroxide 1.5 g. (5%) | 29.5 | 1.65 |
| 2 | Amyl acrylate 30 g. (0.234 mol)<br>Toluene 108 g. (1.17 mol)<br>Benzoyl peroxide 0.6 g. (2%) | 29.5 | 2.13 |
| 3 | Amyl acrylate 30 g. (0.234 mol)<br>Toluene 100 g.<br>Benzoyl peroxide 0.6 g. (2%) | 28.0 | 2.18 |
| 4 | Amyl acrylate 30 g. (0.234 mol)<br>Benzene 92 g.<br>Benzoyl peroxide 0.3 g. (1%) | 28.0 | 4.0 |
| 5 | Butyl acrylate 30 g.<br>Benzene 92 g.<br>Benzoyl peroxide 0.3 g. (1%) | 29.5 | 4.8 |

Example 2

The formation of a butyl acrylate-toluene adduct was studied by noting the index of refraction of the reaction mixture at intervals during a three-hour period. A mixture consisting of 100 g. of butyl acrylate, 333 g. of toluene and 0.5 g. (0.5%) of benzoyl peroxide was placed in a one-liter, 3-neck flask and heated to refluxing temperature. The following results were obtained:

| Time (minutes) | Temperature, °C. | $n_D^{25}$ | Percent Conversion |
|---|---|---|---|
| 0 | 24 | 1.4755 | |
| 15 | 50 | 1.4755 | |
| 22 | 75 | 1.4755 | |
| 35 | 100 | 1.4755 | |
| 40 | 113.5 | | |
| 45 | 112.5 | 1.4838 | 66 |
| 60 | 112.5 | 1.4853 | 77 |
| 75 | 112.5 | 1.4861 | 82 |
| 90 | 112.5 | 1.4863 | 83 |
| 105 | 112.5 | 1.4864 | 84 |
| 120 | 112.7 | 1.4864 | 84 |
| 180 | 65.0 | 1.4867 | 85 |

During the run (at the end of 100 minutes) an additional 0.1 g. of catalyst was added to the reaction mixture. External heating was discontinued at the end of 120 minutes. Upon stripping the resulting reaction mixture of solvent there was obtained 87 g. of the viscous, liquid addition product, having a 10% cyclohexanone specific viscosity of 1.43.

Example 3

This example is like Example 2, except that 72% pure cumene hydroperoxide, instead of benzoyl peroxide was used as catalyst. The following results were obtained:

| Time (minutes) | Temperature, °C. | $n_D^{25}$ | Conversion | Additional Catalyst Added, Percent |
|---|---|---|---|---|
| 0 | 26 | | | |
| 24 | 100 | | | |
| 32 | 113.5 | | | |
| 37 | 114.0 | 1.4750 | 0 | 0.1 |
| 42 | 114.0 | | | 0.1 |
| 47 | 114.0 | 1.4764 | 10 | 0.1 |
| 52 | 114.0 | | | 0.1 |
| 57 | 115.0 | 1.4776 | 19 | 0.1 |
| 72 | 114.5 | 1.4783 | 24 | 0.1 |
| 87 | 114.5 | | | 0.1 |
| 102 | 114.0 | 1.4818 | 51 | 0.1 |
| 142 | 113.0 | | | |
| 185 | 112.0 | 1.4852 | 76 | 0.3 |
| 275 | 111.2 | 1.4863 | 83 | 0.3 |
| 335 | 112.0 | 1.4868 | 86 | |
| 395 | 112.0 | 1.4868 | 86 | |

The resulting reaction product was stripped of excess toluene to yield 90.5 g. of a toluene-butyl acrylate addition product having a 10% cyclohexanone specific viscosity of 1.35. The use of cumene hydroperoxide instead of benzoyl peroxide as catalyst apparently requires longer reaction time when operating at refluxing temperatures. At higher temperatures, i.e., temperatures of approximately 120° C., cumene hydroperoxide may require a shorter reaction time.

Example 4

A mixture consisting of 100 g. (0.78 mol) of n-butyl acrylate, 332.7 g. (3.6 moles) of toluene, and 0.5 g. of benzoyl peroxide was placed in a round bottom flask and stirred at reflux (112° C.) for one hour. An additional 0.1 g. portion of benzoyl peroxide was then added, and refluxing was continued for one hour and twenty minutes longer. At the end of that time unreacted toluene and monomer was removed from the reaction mixture by distillation and there was obtained as residue 87.0 g. of the viscous butyl acrylate-toluene adduct.

Example 5

Operating as in Example 4 except with different quantities of butyl acrylate and toluene and employing cumene hydroperoxide instead of benzoyl peroxide, 225 g. (1.75 mole) of n-butyl acrylate was reacted with 644.91 g. (7.0 moles) of toluene in the presence of a total of 2.0% by weight (based on the acrylate) of cumene hydroperoxide. There was obtained 215.0 g. of the viscous n-butyl acrylate-toluene adduct.

Example 6

The butyl acrylate-toluene adducts of Examples 4 and 5 were evaluated as extending plasticizers with dioctyl phthalate in VYHH 87:13 vinyl chloride-vinyl acetate copolymer using the following procedure:

Mixtures of adduct, copolymer and dioctyl phthalate (DOP) in the weight proportions shown below were respectively worked on a rolling mill to homogeneous blends. Molded tested specimens (1″ x 2″ x 1/16″) of the resulting milled products were tested for volatility characteristics by maintaining the specimens at a temperature of 100° C. for 24 hours, cooling the samples and weighing them in order to determine percent loss in weight. The following results were obtained:

| No. | Composition | Parts | Percent Loss in Weight |
|---|---|---|---|
| 1 | VYHH / DOP | 70 / 30 | 3.55 |
| 2 | VYHH / DOP / Adduct Ex. 4 | 70 / 15 / 15 | 1.37 |
| 3 | VYHH / DOP | 55 / 45 | 2.70 |
| 4 | VYHH / DOP / Adduct Ex. 4 | 55 / 30 / 15 | 0.94 |
| 5 | VYHH / DOP / Adduct Ex. 4 | 55 / 22.5 / 22.5 | 1.33 |
| 6 | VYHH / DOP / Adduct Ex. 5 | 55 / 22.5 / 22.5 | 1.25 |

Operating as in the above examples, other alkylbenzenes or dialkylbenzenes in which each alkyl radical has from 1 to 3 carbon atoms may be similarly reacted with alkyl acrylates to yield adducts having 10% cyclohexanone specific viscosities of less than 4.0. Also instead of using the alkyl esters, there may be used alkoxyalkyl esters of acrylic acid in which the alkoxyalkyl radical has less than 9 carbon atoms. Instead of employing benzoyl or cumene hydroperoxides, other peroxidic compounds or other free-radical-liberating agents may be used as catalysts.

The present adducts are employed advantageously as the sole plasticizers with vinyl chloride-vinyl acetate copolymers or with copolymers, of vinyl chloride and other monomers, e.g., vinylidene chloride. Adducts of the alkyl or alkoxyalkyl acrylates with toluene, xylene, ethylbenzene, cumene or another mono- or dialkylbenzene having from 1 to 3 carbon atoms in the alkyl radical, prepared as herein described, are generally useful as plasticizers or plasticizer extenders with resinous compositions comprising a copolymer of at least 70 percent by weight of vinyl chloride and 30 percent by weight of an unsaturated monomer copolymerizable therewith.

While the present acrylate adducts are very advantageously used as plasticizers for vinyl chloride resins, they may also be employed for a variety of other industrial purposes, e.g., as plasticizers for other synthetic resins and plastics, as heat-transfer media, dielectric fluids, lubricant additives, etc.

This application is a continuation-in-part of my application, Serial No. 372,381, filed August 4, 1953, which application is a continuation-in-part of my application Serial No. 192,338, filed October 26, 1950, both now abandoned.

What I claim is:

1. A liquid mixture of adducts of one mole of an alkyl benzene selected from the class consisting of mono- and dialkyl benzenes in which each alkyl radical has from 1 to 3 carbon atoms and from 10 to 50 moles of an ester having the general formula:

$$CH_2{:}CH.COOY$$

in which Y is selected from the class consisting of alkyl and alkoxyalkyl radicals of from 1 to 8 carbon atoms.

2. A liquid mixture of adducts of one mole of toluene and from 10 to 50 moles of a butyl acrylate.

3. A liquid mixture of adducts of one mole of toluene and from 10 to 50 moles of amyl acrylate.

4. A liquid mixture of adducts of one mole of toluene and from 10 to 50 moles of an alkyl acrylate in which the alkyl radical has from 1 to 8 carbon atoms.

5. The method which comprises contacting, in the presence of a polymerization catalyst, an alkyl benzene selected from the class consisting of mono- and dialkylbenzenes in which each alkyl radical has from 1 to 3 carbon atoms and an ester having the general formula $$CH_2{:}CH.COOY$$

in which Y is selected from the class consisting of alkyl and alkoxyalkyl radicals of from 1 to 8 carbon atoms, and recovering from the resulting reaction product a liquid mixture of polycarboxylate compounds in which one mole of said alkylbenzene is combined with from 10 to 50 moles of said ester.

6. The method which comprises contacting toluene with butyl acrylate, in the presence of a polymerization catalyst, and recovering from the reaction product a liquid mixture of polycarboxylates in which one mole of the toluene is combined with from 10 to 50 moles of the acrylate.

7. The method which comprises contacting toluene with amyl acrylate, in the presence of a polymerization catalyst, and recovering from the reaction product a liquid mixture of polycarboxylates in which one mole of the toluene is combined with from 10 to 50 moles of the acrylate.

References Cited in the file of this patent

UNITED STATES PATENTS 2,752,387 Rehberg _____ June 26, 1956

OTHER REFERENCES

Basu et al.: Proc. Roy. Soc. (London), A202, 488–9 (1950).